United States Patent [19]

Billoué

[11] Patent Number: 4,811,759
[45] Date of Patent: Mar. 14, 1989

[54] DEVICE FOR THE FLUIDTIGHT CLOSURE OF AN APERTURE EXTENDING THROUGH A WALL

[75] Inventor: Jean-Paul Billoué, Chappet, France

[73] Assignee: Framatome, Courbevoie, France

[21] Appl. No.: 104,021

[22] Filed: Oct. 5, 1987

[30] Foreign Application Priority Data

Oct. 6, 1986 [FR] France .................. 86 13872

[51] Int. Cl.⁴ .............................................. F16L 55/10
[52] U.S. Cl. ........................................ 138/89; 165/71; 228/60; 29/157.3 C; 29/402.09
[58] Field of Search ................ 138/89, 90; 165/71; 376/203, 204; 228/119, 126, 128, 131, 133, 136, 165, 168, 60; 29/157.3 C, 157.4, 402.09, 402.07, 402.08

[56] References Cited

U.S. PATENT DOCUMENTS

| | | | |
|---|---|---|---|
| 3,488,829 | 1/1970 | Boniface | 165/71 |
| 4,203,185 | 5/1980 | Beyer et al. | 165/71 |
| 4,279,266 | 7/1981 | Knox et al. | 138/89 |
| 4,286,629 | 9/1981 | Steeich et al. | 138/89 |
| 4,463,597 | 8/1984 | Pierce et al. | 138/89 |

*Primary Examiner*—James E. Bryant, III
*Attorney, Agent, or Firm*—Pollock, Vande Sande & Priddy

[57] ABSTRACT

The device comprises a sleeve (1) and a stopper (5). The inside bore of the sleeve (1) comprises a part having a diameter smaller than the outside diameter of the stopper (5) and ending in a shoulder (2c), against which the stopper (5) comes to bear. Swaging (9) enables the stopper (5) to be fixed in the sleeve (1). The fastening is completed by three sealing welds (10a, 10b, 10c), between which are provided an aperture (4) passing through the side wall of the sleeve (1) and an aperture (8) passing through the side wall of the stopper (5). The device is used in particular for closing holes in a tubular plate of a steam generator of a pressurized water nuclear reactor.

5 Claims, 1 Drawing Sheet

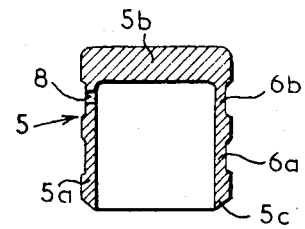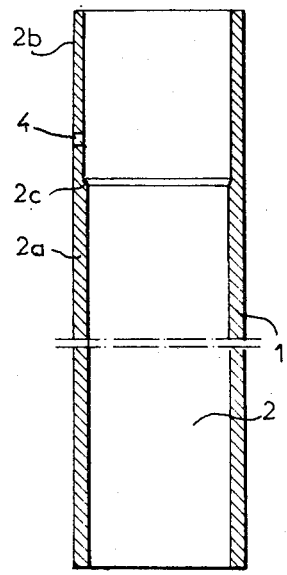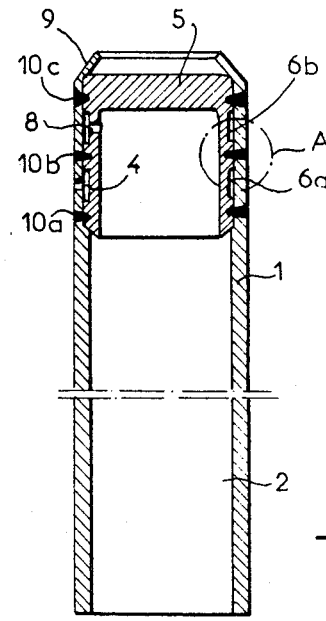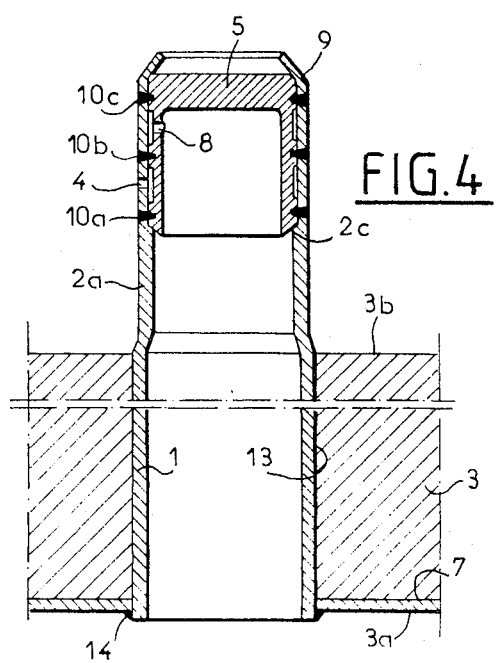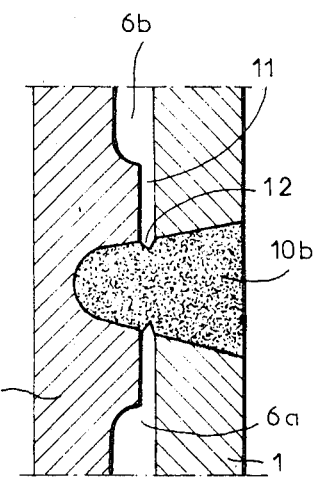

DEVICE FOR THE FLUIDTIGHT CLOSURE OF AN APERTURE EXTENDING THROUGH A WALL

FIELD OF THE INVENTION

The invention relates to a device for the fluid-tight closure of an aperture extending through a wall separating two fluids.

BACKGROUND OF THE INVENTION

Steam generators in pressurized water nuclear reactors generally comprise a very thick tubular plate through which extend holes in which the tubes of the tube nest of the generator are fixed by crimping. The tubular plate is in contact on one side with the pressurized water constituting the primary fluid and on the other side with the feed water, which is heated and vafluid.

When a tube of the nest of tubes of the steam generator is damaged, it is often necessary to extract it from the tubular plate and to close airtightly the hole passing through the tubular plate from which the tube has been extracted. It is in fact necessary to maintain complete separation between the primary fluid and the secondary fluid.

Various techniques have been proposed for closing the holes in a tubular plate in a steam generator which have been left open through extraction of tubes from the nest of tubes.

One of the techniques used consists in placing a stopper directly in the hole in the tubular plate. However, a stopper of this kind does not cover the hole in the tubular plate over its entire length, so that the tubular plate of low-alloy steel is exposed to corrosion by the secondary fluid in the interior of the hole in the uncovered zone. In addition, there is a risk that corrosive products may accumulate in the hole, above the stopper.

In order to avoid these disadvantages, it has therefore been proposed to fit a glove finger covering the entire surface of the hole through the tubular plate. A glove finger of this kind consists of a tube of a length at least equal to the thickness of the tubular plate and closed at one end by a welded end piece. The glove finger is fastened by expansion in the tubular plate over its entire length, the fluid-tight end piece joined by welding being disposed on the secondary side. In order to obviate the need to inspect the weld joint of the end piece periodically, the stresses which act on this weld joint are reduced by subjecting this weld joint and the end piece to equal pressures by forming a communication hole in the side wall of the glove finger. It is therefore necessary to achieve airtightness of the glove finger by means of a stopper, which is placed at the entry of the hole in the tubular plate and of the glove finger, on the primary side.

This technique, which gives satisfactory results in respect of the corrosion resistance of the tubular plate, nevertheless has the disadvantage of entailing a delicate operation and of needing a relatively long intervention time, on the part of the operators, inside the primary part of the steam generator. This means that the operators are exposed to radiation for a relatively long period of time.

SUMMARY OF THE INVENTION

The invention therefore seeks to propose a device for the fluid-tight closure of an aperture extending through a wall separating two fluids, which device consists of a tubular sleeve closed at one end by a stopper of tubular shape which is closed by an end piece permitting effective protection of the aperture in the wall against the action of one of these fluids, and which device possesses very good mechanical strength and very reliable fluid-tightness, the functions of mechanical strength and fluid-tightness being independent, and is easy to place in position by a rapid operation, even in an irradiated environment.

To this end, the inside bore of the sleeve comprises in succession, in the axial direction, a first part whose diameter is smaller than the outside diameter of the stopper, and a second part receiving the stopper and having a diameter corresponding substantially to that of the stopper, while an annular shoulder separates the two parts of the bore;

the sleeve has an aperture passing through its side wall and leading into the second part of the bore;

the stopper also has an aperture passing through its side wall and so disposed that, when the stopper is placed in position in the sleeve and held in place by swaging the sleeve, said aperture will be situated nearer the closed end than the aperture in the sleeve;

and three continuous sealing and fastening welds of annular shape, connecting the outer surface of the stopper and the inner surface of the sleeve over their entire periphery and being disposed, in the case of two of them, one on each side of the set of two apertures in the stopper and in the sleeve, and in the case of the third, between the two apertures, are made prior to the placing of the closure device in the aperture in the wall.

BRIEF DESCRIPTION OF THE DRAWINGS

In order to enable the invention to be more clearly understood, a description will now be given, by way of example and with reference to the accompanying drawings, of one form of construction of a closure device according to the invention, for closing a hole extending through the tubular plate of a steam generator in a pressurized water nuclear reactor.

FIG. 1 is a view in axial section of a sleeve in a closure device according to the invention.

FIG. 2 is a view in axial section of a corresponding closure stopper.

FIG. 3 is a view in axial section of the sleeve and the stopper after they have been fastened to one another and before they are placed in position in a steam generator plate.

FIG. 4 is a view in axial section of a closure device according to the invention after it has been placed in position in the tubular plate of a steam generator.

FIG. 5 is a view on a larger scale of detail A in FIG. 3.

DESCRIPTION OF PREFERRED EMBODIMENT

The sleeve 1 of a closure device according to the invention can be seen in FIG. 1. The tubular sleeve 1 has an outside diameter equal to that of a tube in the nest of tubes of the steam generator and a length slightly greater than the thickness of the tubular plate of the steam generator. The inside bore 2 of this sleeve comprises two successive zones 2a and 2b, the zone 2b of larger diameter being formed by remachining the sleeve in its end zone and being separated from the zone 2a of smaller diameter by a frusto-conical shoulder 2c.

The side wall of the sleeve 1 has passing through it an aperture 4 which leads into the bore 2 in its widened part 2b.

The stopper 5 shown in FIG. 2 comprises a tubular body 5a and a closure end piece 5b. The stopper 5 can advantageously be produced in a single piece by machining a cylindrical blank. The maximum outside diameter of the tubular part 5a and the outside diameter of the end piece 5b correspond substantially to the diameter of the widened part 2b of the bore 2 in the sleeve. At the end opposite the end piece 5b the tubular part 5a ends in a frusto-conical rim 5c having the same apex angle as the frusto-conical shoulder 2c on the sleeve.

The tubular body 5 is machined on its outer surface to form two grooves 6a and 6b, the depth of which corresponds to a fraction of the thickness of the tubular wall 5a. An aperture 8 passes through this tubular wall at the groove 6b situated closer to the end piece 5b.

The closure device is assembled by introducing the stopper 5 into the part 2b of the sleeve bore, so that the stopper comes to rest with its frusto-conical rim 5c on the frusto-conical shoulder 2c.

The stopper 5 being slightly shorter than the part 2b of the bore, the end portion of the sleeve 1 projects beyond the end piece 5b. Swaging 9 (visible in FIG. 3) is effected on this part of the sleeve which projects beyond the stopper. The stopper 5 is thus held by mechanical locking inside the sleeve 1.

The position of the aperture 4 in the sleeve, in the zone of the bore 2b next to the shoulder 2c, and the position of the aperture 8 in the stopper near the end piece 5b are such that the aperture 8 in the stopper is situated nearer the closure end piece 5b than the aperture 4 in the sleeve 1 when the stopper is placed in position in the sleeve, as shown in FIG. 3.

The fastening and fluid-tight sealing of the stopper in the sleeve are completed by three annular welds 10a, 10b and 10c joining the inside surface of the sleeve to the outside surface of the stopper. The welds are made from the outside of the sleeve, in which the stopper has been placed, for example with the aid of an orbital welding device.

In FIG. 5 it is possible to see the central weld 10b enabling the sleeve 1 and the stopper 5 to be joined through the fitting clearance 11 between these two parts.

The welds 10a and 10c are disposed one on each side of the set of two apertures 4 and 8 in the sleeve and stopper, respectively, and the central weld 10b is disposed between these two apertures.

The position of the aperture 4 in the sleeve is such that, when the stopper is in position, this aperture leads into the groove 6a. The welds 10a and 10c are therefore also disposed one on each side of the set of two grooves 6a and 6b, and the weld 10b is situated between these two grooves 6a and 6b.

FIG. 4 shows the closure device after it has been placed in position in a very thick tubular plate 3 of a steam generator. The bottom face 3a of said tubular plate, which comes into contact with the primary fluid, is covered with an anti-corrosive coating 7. The top face 3b of the tubular plate is intended to come into contact with the secondary fluid consisting of the feed water of the steam generator.

The part of the tubular plate shown in FIG. 4 has a hole 13 passing through its entire thickness and intended to receive a steam generator tube. During maintenance operations on the nuclear reactor, this tube, which had been damaged, was extracted from the hole 13 in the tubular plate 3. The hole 13 was closed with the aid of the closure device according to the invention, which is shown in FIG. 3. For this purpose, the device is introduced into the hole 13 from the face 3a, i.e. from the primary side of the steam generator. The diameter of the sleeve 1 of the device is identical to the diameter of a tube of the nest of steam generator tubes and very slightly smaller than the diameter of the hole 13. The sleeve in position in the tubular plate 3 is expanded in diameter in order to fasten it in the hole 13. The closed end part of the closure device consisting of the stopper 5 projects in relation to the face 3b of the tubular plate in the secondary part of the steam generator.

The fastening of the sleeve 1 in the hole 13 is completed by an expanding operation on all of that part of the sleeve which is situated in the thickness of the tubular plate 3. Finally, a weld 14 ensuring strength and fluid-tightness completes the definitive fastening of the closure device constituting a glove finger.

The fluid-tight closure of the hole 13 is therefore effected by a simple operation of expansion and widening, supplemented by welding. This conventional operation is relatively quick and makes it possible to avoid exposing operators to radiation over a long period.

Furthermore, the mechanical strength of the glove finger, i.e., essentially of the joint between the stopper and the sleeve, is ensured in different ways, thus increasing the reliability of the device. In fact, the stopper is both held inside the sleeve by the shoulder 2c and by the swaging 9, and it is fixed by the three annular weld lines 10a, 10b and 10c. These means for the fastening of the stopper are totally independent, so that in the event of the failure of one of these means, for example the failure of the weld joints, the other means will continue to hold the stopper in place.

In addition, the sealing function served by the weld rings of the stopper is independent of the mechanical retention function served by the shoulder 2c and the swaging 9.

Any loss of fluid-tightness of the stopper can easily be detected by checking the activity of the secondary fluid. In the event that any one of the welds 10a, 10b or 10c develops a leak, pressurized radioactive primary fluid will flow into the closure device and spread into the secondary part of the steam generator. If the weld 10a should leak, the primary fluid will be able to pass into the secondary part of the steam generator by way of the groove 6a and the aperture 4. If the weld 10b is defective, primary fluid will be able to pass into the secondary part by way of the aperture 8, the groove 6b the groove 6a and finally the aperture 4. Finally, if the weld 10c is defective, primary fluid can pass into the secondary part by way of the aperture 8 and the groove 6b.

It is quite clear that the grooves 6a and 6b are not absolutely indispensable if sufficient clearance is allowed between the side surface of the sleeve and of the stopper outside the zone in which they are joined by welding.

In all cases where a weld cracks or fractures, this defect is therefore very quickly detected without the mechanical fastening of the stopper by the other welds being compromised. It is thus possible to attend very quickly to the closure device well before its failure has any substantial effect.

The progressivity of the failure of the functions of sealing and mechanical strength of the device can be further improved by adjusting the resistant sections of the various welds 10a, 10b, 10c to different values, in such a manner as to reduce the probability of the simultaneous loss of the sealing function of these three welds. An adjusted resistant section 12 of this kind is shown for the weld 10b in FIG. 5. It may be achieved by using different welding parameters for each of the three welds.

The fluid-tight closure device according to the invention is easy to install and very reliable, while its sealing and mechanical strength functions are independent. In addition, its behavior in service is easy to check, and any loss of tightness is detected well before there is any risk of the stopper being detached and constituting a migrant body in the nuclear reactor.

When a slight leak is detected, it is therefore possible to wait until the programmed stoppage of the nuclear reactor before attending to the closure device giving rise to the leak.

The application of complex procedures for checking the closure devices during programmed stoppages of the reactor is also avoided.

The glove finger shape of the device, projecting into the interior of the secondary part of the steam generator, also makes it possible to avoid the occurrence of local boiling, the concentration of corrosive substances in contact with the closure device and in the tubular plate, and therefore the risk of rapid corrosion of this device and of the tubular plate.

The glove finger can be placed in position and fixed with the aid of a tool manipulator and control device used in the operations of inspection and maintenance of the nest of tubes of a steam generator.

Finally, in the event of the failure of a glove finger, it can be extracted with conventional extraction means and replaced.

The sleeves and stoppers may be slightly different in shape from those described, being adapted to the shape and dimensions of the tubular plate or other wall and of the holes which are formed in tubular plate and in which the closure device is fitted.

Finally, the closure device according to the invention may be used to close apertures extending through a wall different from the tubular plate of a nuclear reactor steam generator.

What is claimed is:

1. Device for the fluid-tight closure of an aperture extending through a partition wall separating two fluids, which device consists of a tubular sleeve closed at one end by a stopper of tubular shape closed by an end piece, wherein the inside bore (2) of the sleeve (1) comprises, in succession, in the axial direction, a first part (2a) whose diameter is smaller than the outside diameter of the stopper, and a second part (2b) receiving the stopper and having a diameter corresponding substantially to that of the stopper (5), an annular shoulder (2c) separating the two parts (2a, 2b) of the bore, and wherein (a) the sleeve (1) has an aperture (4) passing through its side wall and leading into the second part (2b) of the bore (2);
   (b) the stopper (5) also has an aperture (8) passing through its side wall (5a) and so disposed that, when the stopper (5) is placed in position in the sleeve (1) and held in place by swaging (9) the sleeve (1), said aperture (8) in said stopper will be situated nearer the closed end (5b) than the aperture (4) in the sleeve (1), and that three continuous sealing and fastening welds (10a, 10b, 10c) of annular shape, connecting the outer surface of the stopper (5) and the inner surface of the sleeve (1) over their entire periphery and being disposed, in the case of two of them, one on each side of the set of two apertures (4, 8) in the stopper (5) and in the sleeve (1), and, in the case of the third, between the two apertures (4, 8), are made prior to placement of the closure device in the aperture (13) in the partition wall (3).

2. Closure device according to claim 1, wherein the stopper (5) has two grooves (6a, 6b) in its outer side wall, the aperture (8) in the stopper extends through the side wall (5a) of said stopper at the groove (6b) situated closer to the end piece (5b) of the stopper (5), and, when the stopper (5) is in position in the sleeve (1), the aperture (4) in the sleeve (1) leads into the groove (6a) further from the end piece (5b) of the stopper.

3. Closure device according to claim 1 or 2, wherein the shoulder (2c) between the two successive parts of the bore (2) of the sleeve (1) is frusto-conical in shape, and the end (5c) of the stopper (5) opposite to its end piece (5b) has a corresponding frusto-conical shape.

4. Closure device according to claim 1 or 2, wherein the welds have resistant sections adjusted to different values in order to reduce the probability of simultaneous failure of the three welds (10a, 10b, 10c).

5. Closure device according to claim 1, wherein the partition wall consists of the tubular plate (3) of a steam generator of a pressurized water nuclear reactor and the aperture (13) through the partition wall consists of a hole for the passage of a tube of the steam generator, the sleeve (1) having an outside diameter identical to the diameter of the tube of the steam generator.

* * * * *